(12) United States Patent  (10) Patent No.: US 8,207,937 B2
Ambuehl et al.  (45) Date of Patent: Jun. 26, 2012

(54) COMMUNICATION PROTOCOL FOR NETWORKED DEVICES

(75) Inventors: Rolf Ambuehl, Lausanne (CH); Jean-Daniel Zanone, Lausanne (CH); Simone Arrigo, Bellinzona (CH); Xavier Bize, Gex (FR)

(73) Assignee: Logitech Europe S.A. (CH)

( * ) Notice: Subject to any disclaimer, the term of this patent is extended or adjusted under 35 U.S.C. 154(b) by 912 days.

(21) Appl. No.: 11/473,736

(22) Filed: Jun. 23, 2006

(65) Prior Publication Data

US 2007/0019771 A1 Jan. 25, 2007

Related U.S. Application Data

(60) Provisional application No. 60/693,703, filed on Jun. 24, 2005.

(51) Int. Cl.
*G09G 5/00* (2006.01)
*G06F 3/033* (2006.01)

(52) U.S. Cl. ........ 345/156; 345/163; 345/169; 345/158; 455/41.2; 455/508; 463/37

(58) Field of Classification Search .................. 345/156, 345/163–169; 455/39, 41.2, 500–512, 514–515, 455/517, 526–528; 463/37–38
See application file for complete search history.

(56) References Cited

U.S. PATENT DOCUMENTS

| 5,276,703 | A | * | 1/1994 | Budin et al. | 375/130 |
| 5,881,366 | A | * | 3/1999 | Bodenmann et al. | 455/41.2 |
| 6,084,638 | A | * | 7/2000 | Hare et al. | 348/552 |
| 6,934,752 | B1 | * | 8/2005 | Gubbi | 709/225 |
| 2002/0006137 | A1 | * | 1/2002 | Rabenko et al. | 370/466 |
| 2002/0062388 | A1 | * | 5/2002 | Ogier et al. | 709/238 |
| 2002/0116500 | A1 | * | 8/2002 | Arora et al. | 709/227 |
| 2003/0091096 | A1 | * | 5/2003 | Agrawal et al. | 375/132 |
| 2006/0035590 | A1 | * | 2/2006 | Morris et al. | 455/41.2 |

* cited by examiner

*Primary Examiner* — Lun-Yi Lao
*Assistant Examiner* — Jarurat Suteerawongsa
(74) *Attorney, Agent, or Firm* — Fenwick & West LLP

(57) ABSTRACT

A communication protocol in a wireless network of a transceiver and a plurality of devices, in which at least one device is a bidirectional device, and in which one or more other devices can be unidirectional devices. The unidirectional device communicates with the transceiver in a unidirectional mode from the device to the transceiver and the bidirectional device communicates with the transceiver either in a bidirectional mode or in an unidirectional mode from the device to the transceiver. The communication protocol is configured to determine which transmission mode is to be used for each device. Various techniques are provided in order to optimize the time and energy spent to transmit information from one peer to the other.

18 Claims, 8 Drawing Sheets successful transaction of a report length change network topology  101 time division multiple access (TDMA)

random added jitters on repetitions repetition vs frequency hopping unsuccessful channel change successful channel change unidirectional traffic example with jitters successful transaction of a report length change

COMMUNICATION PROTOCOL FOR NETWORKED DEVICES

CROSS REFERENCE TO RELATED APPLICATIONS

This application claims a benefit of U.S. Provisional Application No. 60/693,703, filed Jun. 24, 2005, which is incorporated by reference in its entirety.

BACKGROUND

1. Field of Art

The present invention relates to radio frequency communication protocol and, more particularly, a flexible system comprising a network of a transceiver and several human interface devices (HIDs) using either unidirectional or bidirectional mode to communicate with the transceiver, as well as optimization of a transmission between the transceiver and the HIDs, and pairing the transceiver with the HIDs.

2. Description of the Related Art

A network of wireless devices is often configured with a host transceiver communicating with one or more devices. The devices communicate through a conventional wireless communication protocol. Among existing communication protocols, low frequency protocols have the advantage of being simple and low cost. However, although systems using such protocols are less complex, they also have significant limitations that include lower bit rates and shorter communication ranges. High frequency protocols have higher bits rates and longer ranges. However, systems using such protocols are more complex to design and implement. This results in greater development and implementation costs as well as increased use of resources such as transmission and processing power, which increases power consumption.

In the context of a conventional networks of HIDs, the HID devices are either unidirectional or bidirectional devices that communicate with a transceiver. Generally, a network with unidirectional devices allows use of a low cost and simple transceiver in particular in terms of electronics and firmware. However, unidirectional transmission requires transmitting additional, redundant information in order to compensate the lack of reliability of the link. Likewise, a network with bidirectional devices generally allows reliable data transmission. However, such configurations cost time and energy because devices must wait for acknowledgement from the receiver. In addition, such conventional networks do not offer the necessary flexibility for various kinds of applications.

In addition to the problems outlined above, other problems also exist with conventional HID configurations (or applications). For example, a conventional communication network of HIDs is generally implemented within low and middle radio frequency Industrial Scientist Medical bands (ISM bands). However, some ISM bands do not have worldwide acceptance and approval. To address this problem, many HID configurations use a high radio frequency ISM band, for example 2.4 GHz.

The use of such high frequency bands is not without costs. It increases system complexity, and in turn, costs. In addition, such systems increase power consumption. This reduces the operational time of battery powered type devices. Moreover, devices operating in this same frequency band have problems of collision with each other. For example, in the 2.4 GHz band, data transmission collisions may occur in devices of types that are communicative through a Bluetooth protocol, wireless local area network (WLAN) protocol, or as a cordless phone. This causes a reduction or overall failure of data throughput.

Also known is communication protocols that handle multiple devices on a single host, for example, Bluetooth host networks. However, Bluetooth is a very complex protocol. It requires significant hardware and software resources to be present in each node in order to work. Although Bluetooth devices in some configurations give an appearance of being unidirectional devices, the communications are in fact bidirectional, not unidirectional. Specifically, careful study of the low-level communications structure shows that the underlying radio communication is bidirectional, even though transmission in one of those directions does not transport useful user data. Thus, the extraneous data send in such devices unnecessarily occupy bandwidth and increases power consumption.

Hence, there is a need for a system and process that is configured for unidirectional or bidirectional communication between transceiver and a HID, that provides robust communication without increasing power consumption and without significantly increasing operational and manufacturing costs. In addition, there is a need for a radio frequency (RF) subsystem and associated processing configuration that remains active, without waiting in vain for RF reports, while allowing for predictability that the next report could be expected only after some passage of time.

SUMMARY

Embodiments of present invention include a network of a transceiver and a plurality of human interface devices (HIDs). The transceiver and HIDs communicate through a wireless communication protocol in accordance with the embodiments disclosed herein. The wireless configuration protocol is configured for use with all frequency bands.

According to a first aspect of the present invention, a flexible communication protocol allows for integrated communication between a single transceiver and devices configured for unidirectional communication and devices configured for bidirectional communications. Through this networked configuration of a transceiver and several devices, e.g., HIDs, using either unidirectional or bidirectional transmission mode to communicate with the transceiver, the protocol determines which transmission mode to use to optimize communications between each device and the transceiver. This, the configuration places cost, complexity and reliability at the places considered to be most relevant within the network.

In one embodiment, at least one human interface device within the network may use a "mixed transmission mode." A mixed transmission mode allows for switching between unidirectional to bidirectional transmission modes. Mixed transmission mode allows for reduced power consumption and optimized data transmission. In addition, for a device capable of bidirectional linking, information may be split and transmitted in two categories. A first category would require reliability, albeit with some cost of time and energy, as the device waits for an acknowledgement from the receiver. A second category would allow for information to occasionally drop because it allows for renouncement of acknowledge. The present communication protocol can also be structured to allow devices to mix reports that require an acknowledge and reports that do not require acknowledge. Thus, the communication protocol has flexibility to function with devices configured to generate bidirectional traffic or unidirectional traffic depending on the importance of the data for transportation, e.g., greater reliability of data transportation.

In one embodiment (and independently from to the mixed configuration) each device is its own master and can send out data when necessary. This beneficially reduces power consumption and complexity on the human interface device side by eliminating the need to consistently listen to a beacon signal when no data is transmitted and suppressing initial latency when data is transmitted.

According to a second aspect of the present invention, the communication protocol includes features for optimizing the transmission link between the transceiver and any of the human interface devices of the network. These optimized transmission features consist in avoiding as much as possible collisions with other applications. In an example embodiment, smart timing is implemented to send data in order to avoid collisions with applications using frequency hopping transmission, e.g., Bluetooth.

Another embodiment includes a frequency agility method to avoid collisions with channels commonly used by applications, e.g., a WLAN signal, which may be considered as static in a certain extent, by selection of quiet channels not used by such common applications. In addition, to avoid collisions with neighboring devices, jitter is added to report timing. Further, detection of a link-loss condition and entrance into a recovery mode with use of a smart table of channels to re-establish connection, when either a badly affected transmission or no transmission at all can be established, may be implemented.

A third aspect of the present invention includes a smart pairing by which the transceiver and each human interface device of the network exchange information such as the minimum time between transmissions of two consecutive data packets. This smart pairing involves data initially transmitted between the transceiver and each device in order to optimize future transmissions between them. Thus, during this "free time" (minimum time between two transmissions) the transceiver can rest to save power or may open a negotiation procedure with any of the devices to adjust this period of time between two transmissions or open a new negotiation in order to free bandwidth for the transceiver, or spend time on other tasks. As the transceiver knows when to expect next report it may detect a link-loss condition in case no data is received, and possibly even take actions to recover the link without the user noticing. Thus, advantages of smart pairing include power consumption reduction and communication optimization.

Advantages of the present invention can be illustrated by example. For example, consider a configuration having two human interface devices, specifically a cordless mouse and a cordless multimedia keyboard, that are coupled with a personal computer. In this configuration, the purpose of the mouse typically is to send XY displacement and button click information (or data or reports) to the host PC. In this configuration, no information needs to be transported from the host to the mouse. Therefore, the mouse can be configured to have an active radio transmitter and an inactive, or removed, radio receiver.

With respect to the keyboard, it might feature a screen, e.g., a liquid crystal display screen. The host may be configured to send data to the keyboard for display on the screen. The keyboard can be configured to receive data from the host display on the screen while the user continues typing. Such a configuration leverages a bidirectional link. Thus, in this overall desktop configuration, the mouse can be configured with a unidirectional link with respect to the host, which significantly reduces the complexity of the mouse, and a the keyboard can be configured with a bidirectional link with the host allowing for greater keyboard related functionality. The configuration, therefore, requires a nominal amount of hardware and software resources relative to solutions such as Bluetooth.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

The Figures (FIGS.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

It will be understood that the forthcoming description is given only by way of example. In particular, the protocol according to the invention can be implemented for any frequency range, even if the following description describes an example for a device operating in a 2.4 GHz and/or 27 MHz range. Moreover, other types of wireless transmissions (e.g., optical transmission) are also possible using the principles disclosed herein.

System Architecture Overview

Figure 1:
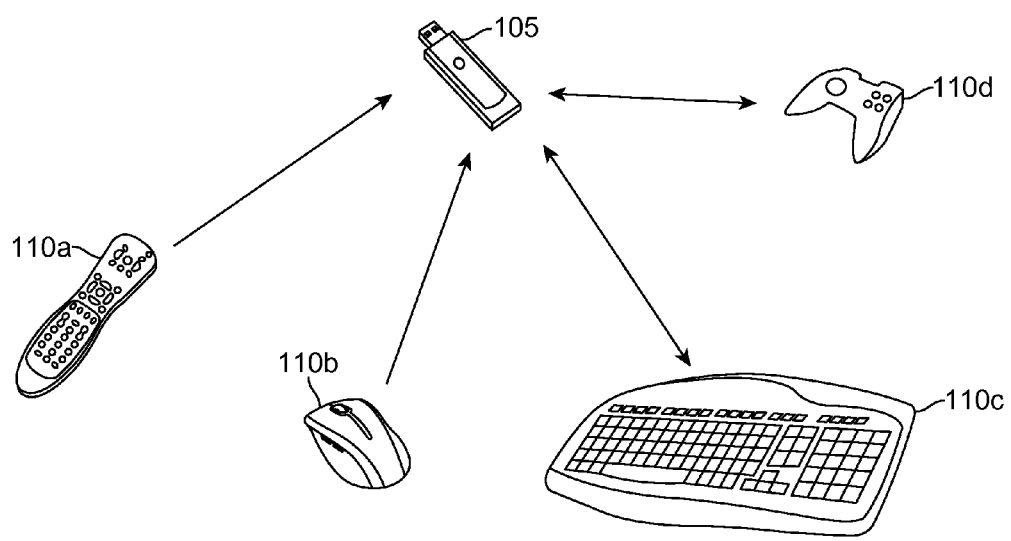
FIG. 1 shows an example of network topology according to the first embodiment of the invention.

FIG. 1 illustrates one example of a network topology 101. The example network topology 101 comprises a transceiver 105 and two or more human interface devices 110. In one embodiment, the transceiver 105 is structured for coupling a universal serial bus (USB) port (e.g., a USB key structure) or a personal system/2 (PS/2) port. In addition, in one embodiment the two or more human interface devices (HIDs) can be a remote control 110a, a cordless pointing device 110b (e.g., a mouse, a trackball, trackpoint, a digital pen, or a touch pad), a keyboard 110c and/or a gaming device 110d (e.g., a game pad, joystick, or driving wheel).

The transceiver 105 is configured to communicatively couple (connect with) a host (e.g., a personal computer) (not shown). When communicatively coupled, the transceiver 105 "translates" radio frequency reports (or formatted data) to USB or accordingly PS/2 reports. Each device is to be considered as any human interface device or peer other than the transceiver. Reports, represented on FIG. 1 by arrows between a device 110 and each peer (or device), are sets of information (or data) that are grouped in a given format. When needed, e.g. for unidirectional devices, the reports are provided with a redundancy mechanism which involves multiple transmissions to increase the probability that reports are received at least once by the transceiver 105.

A group of redundant reports conveying the same payload, which is the effective data to be transferred from or to the device, comprises a frame. Downstream, which is illustrated in the drawing as the arrows pointing towards the devices, e.g., 110c, 110d, corresponds to transmission from the host or transceiver 105 to any such device, e.g., 110c, 110d. Upstream, which is illustrated in the drawing as the arrows pointing towards the transceiver 105, corresponds to transmission from any such device, e.g., 110a, 110b, to the host or transceiver 105. Bidirectional devices, e.g., 110c, 110d, may also be capable of sending unidirectional traffic, i.e. reports not requiring acknowledge or other return communication.

All devices 110 share a same base address (addressing is further described below), but the transceiver 105 uses a different address suffix to transmit, unique to each device, so that the bidirectional device does receive the traffic from the other device. Each device in the network 101 has its own destination number or destination identifier (ID) which is typically allocated by the transceiver 105. This allows each device to receive reports only for this device. Note that destination ID may be part of the address.

The transceiver 105 and a device 110 are paired when the transceiver 105 knows a base address for the device, the destination ID and timing characteristics. Alternatively the transceiver 105 and a device 110 are paired when the device shares the base address and destination ID, and knows an address of the transceiver address and timing characteristics. When paired, the link is not necessarily established. For example, a particular device 110 and the transceiver 105 could be out of range or switched off. The transceiver 105 and a bidirectional device 110 are communicatively coupled (or connected) when they are paired and the link is established. Establishing a link comprises an agreement by the transceiver 105 and the device 110 on a channel. Thereafter, communication regularly takes place.

One embodiment of the communication protocol is targeted to a high frequency ISM band, e.g. 2.4 GHz, (but may be also implemented for any other frequency band) for systems comprising one transceiver and two or more human interface devices, e.g., 110b, 110c, with burst mode. It is noted that the communication protocol could be transposed to virtually any other silicon or frequency bands. In addition, the communication protocol accommodates unidirectional and bidirectional devices that operate simultaneously. Further, in one embodiment the communication protocol promotes frequency agility rather than frequency hopping. In addition, in one embodiment the communication protocol is configured such that transmission and reception do not occur simultaneously on the same device. However, alternative embodiments would allow for simultaneous transmission and reception. Alternative embodiments could also include non-radiowave transmissions, such as optical.

Unidirectional devices, e.g., 110a, 110b, communicate in one direction at a time. Unidirectional devices can be configured to include a button (or any other mechanism) that permits channel change so that if a particular channel is "occupied" another channel can be selected for communication with the transceiver. The communication protocol is configured so that transmission occurs when desired or necessitated by the device, 110b, 110c. Thus, the device does not require a beacon from the transceiver. The downstream latency (e.g. notifications) may depend on the device's polling rate. The transceiver 105 handles coexistence between devices in embodiments in which the devices do not listen to each other. However, in some embodiments the devices can be configured in a peer-to-peer or master-slave configuration with respect to each other (e.g., a personal digital assistant (PDA) that is a peer device with respect to another PDA, a master device with respect to a remote control, or a slave device with respect to a host computer).

Each radio frequency packet starts with an address. If the address does not match, the packet is rejected by the transceiver 105. Preferably, two channels are supported simultaneously, although additional channels can also be supported. All devices within a desktop can be preconfigured (e.g., factory-programmed) to the same address and the same channel. However, although the devices also may be configured to allow a user can later change the channel of the unidirectional devices, the previously configured address would not change.

Flexible Communications Protocol

A first aspect in accordance with the present invention includes a communication protocol adapted to a network, e.g., 101, comprising a transceiver, e.g. 105, and two or more human interface devices, e.g., 110b, 110c, that provide input functionality, for example as illustrated in FIG. 1. In the illustrated embodiment in FIG. 1, the network 101 topology is star-shaped, where the transceiver 105 is the center (or hub) of the star. Each device 110 maintains its own link with the transceiver 105. In some embodiments, neighboring devices may have no knowledge of other device connections and activities with the transceiver 110. Further, in this configuration handling (and in some instances, synchronizing) of multiple device links can be determined by the transceiver.

With reference to the human interface devices in FIG. 1, there are illustrated unidirectional devices, e.g., 110a, 110b, and bidirectional devices, e.g., 110c, 110d. Unidirectional devices typically transmit data in one direction, for example from the human interface device to the transceiver 105 (or just the receiver component on a host system). Examples of unidirectional devices include a remote controller 110a and a mouse 110b. In a unidirectional configuration of devices the transceiver 105 operates as a unidirectional device and listens to only one channel. This configuration typically offers no fast channel switching. In addition, the unidirectional configuration does not require an acknowledge transmission. Thus, in a unidirectional configuration the transceiver has a minimum workload, which often results in reduced power consumption and saved energy.

Bidirectional devices can both transmit and receive data (duplex communication). Two directions are thus possible—from the human interface device to the transceiver (receiver functionality) and from the transceiver (transmitter functionality) to the human interface device. Examples of bidirectional devices include a keyboard, a game pad, or a force-feedback mouse. Hence, in a bidirectional configuration of devices the transceiver 105 operates as a bidirectional device. Although a bidirectional communication allows transport of user data in both directions, the embodiment cannot make use of it, and simply use bidirectionality to make the transport of data in a single direction more reliable by returning an acknowledge that the data has safely arrived to the other peer.

When two or more human interface devices 110 are communicating with the transceiver 105, the transceiver 105 can be configured to listen to two frequencies using time-multiplexing. Although this can be configured for both unidirectional and bidirectional communications, the protocol can be configured to have a bidirectional communication change its channel so that only one channel is used. In the absence of a report, the transceiver 105 hops from one channel to the other after a determined period of time. When a valid report is received, the transceiver 105 determines the earliest time of next report on this channel, based on the repetition number and device type. This allows the transceiver 105 to listen longer on the other channel, which maximizes opportunities to receive a report from the other device. In case of bidirectional devices, the transceiver 105 can be configured to have all bidirectional devices on the same channel, which eliminates a need for frequency switching. In turn, this would further simplify transceiver side implementation and management, and reduces frequency perturbations.

Turning to an example of a unidirectional device such as a remote control, e.g., 110a, such device might send longer bursts, e.g., packets of data, on all available channels. There is no need for low latency. Further, the remote control device 110a is defined to be unidirectional; otherwise it will fall into the "bidirectional keyboard" category. Although it is unidirectional, in some configurations there is no channel change mechanism. Instead, the remote control broadcasts (e.g., redundantly transmits the same information) on a series of channels, so that the transceiver 105 will always be able to receive its packets.

Referring now to another unidirectional device, e.g., a mouse 110b, it features a manual means for changing channels. Unlike a bidirectional device, a unidirectional device does not receive feedback from the transceiver 105 about the link quality. Thus, it is unable to decide when to perform a channel change for a communication. Therefore, a user typically performs a channel change action manually using a connect button or any other defined procedure. Alternatively, a bidirectional mouse device 110b is capable of performing frequency agility by itself. Thus, a bidirectional mouse 110b requires no connect/channel change button. Nevertheless, a bidirectional mouse 110b can also be configured to provide an optional user mechanism to allow channel change or re-pairing.

Turning now to a bidirectional device, e.g., a bidirectional keyboard 110c, is capable of performing frequency agility by itself. Thus, such devices require no connect/channel change button. An optional user mechanism/action may be made available to allow re-pairing. Alternatively, if the keyboard is a unidirectional keyboard, it would include a feature a button (or any other mechanism, such as power button acting as channel change on a short press and power on a long press) to allow channel change. In such configurations, the device typically requires user action. To reconnect a unidirectional keyboard, it is possible to type in an address into a keyboard, so such a mechanism could be defined.

Following are examples of data transmission respectively from one unidirectional device to the transceiver 105, from one bidirectional device 110 to the transceiver 105 and according to an embodiment from one mixed device 110 (unidirectional and bidirectional) to the transceiver 105. For a single unidirectional device, the device e.g., 110a, 110b, transmits a frame as needed. In one embodiment, the device is configured to repeat transmission a fixed number of times. In addition of indicating the fact that the report is a repetition of the previous one, another field is used to "time-tag" each report, to indicate the occurrence of the next new report. This way, the transceiver 105 knows when to expect the earliest next frame report, freeing the receiver to listen to the other channel.

The timing of repetition for a report is fixed differently for each device type. Jitter consists of adding or subtracting a short period of time to the repetition timing. In the represented example, at time t=0, the device decides to transmit a data report having a determined frame counter. The report rate is one report every predefined period TS, for example 8 ms, and then there would be no less than said defined period remaining until next frame. The predefined period can be preconfigured or can be changeable (e.g., by a user through an interface that allows such changes).

In the case of the predefined period, TS, note that the first report may be jammed at the transceiver 105 by another device sending on the same channel (but using a different address), at the exact same time. In such cases, the device, e.g., 110, resends the report with the same frame counter after a shorter period than defined period TS, for example, after 2.1 ms. Thus, the system can be configured to ensure that the transceiver 105 receives at least one report from a unidirectional device sending a report a predetermined number of times (e.g., 3 times) report, when that transceiver 105 is listening alternately to the two available channels.

It is noted that a random jitter may be introduced to this timing for a device, e.g., 110, and reported in the timestamp field. The timestamp encodes the time until next earliest frame from the device (allows the receiver to schedule the next expected report, discarding any useless repetition meanwhile). Thereafter, the device can send the report a third time with the same frame counter and using again a random jitter. With such redundancy, the report generally gets through and is received by the transceiver. The device then may send out its next report after said defined period, TS, with a new upstream frame number.

Figure 2:
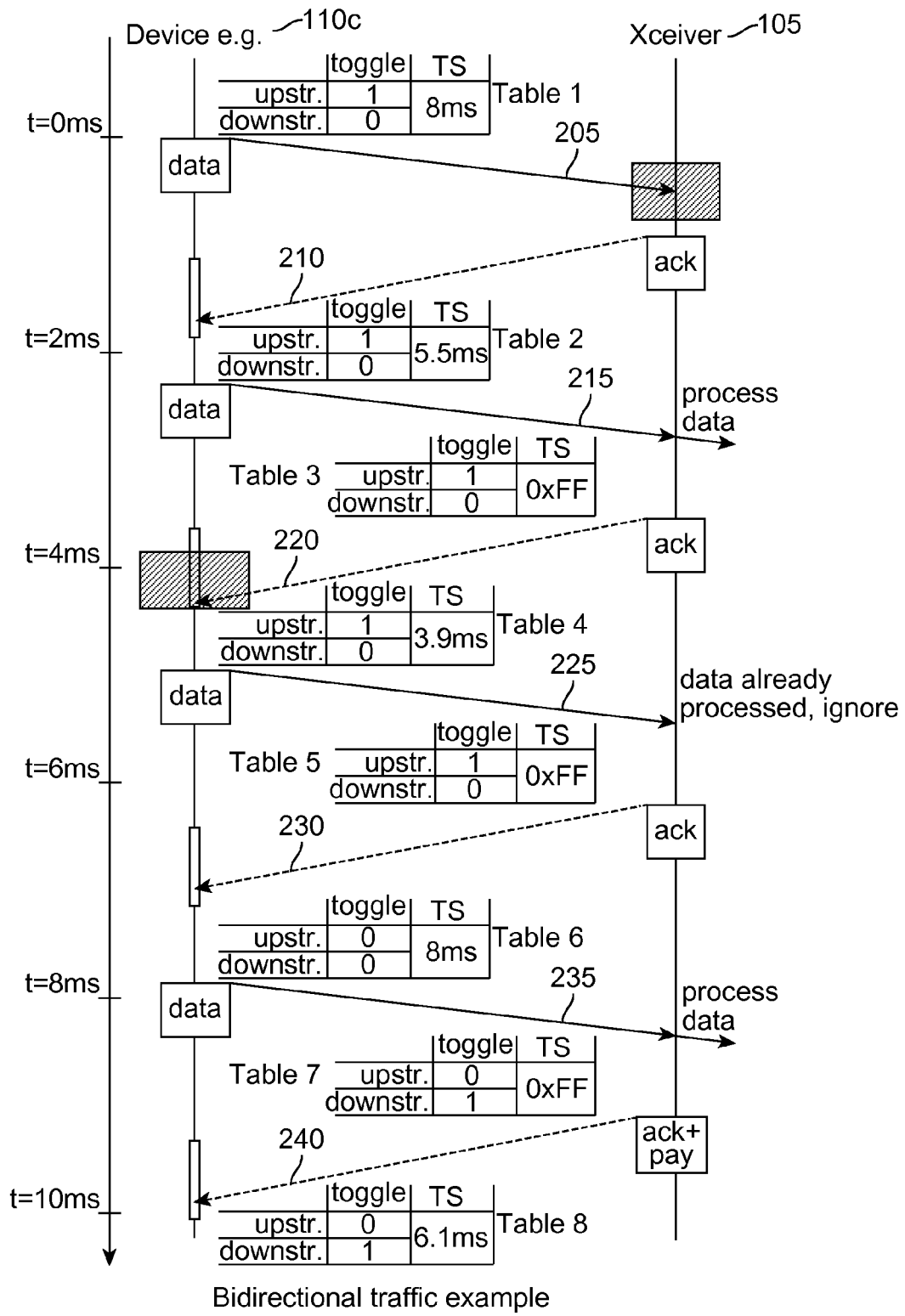
FIG. 2 shows an example of bidirectional traffic, including recovery for occasional lost packets, between one device and the transceiver.

FIG. 2 shows a bidirectional traffic example, in which the device, e.g., 110, transmits a frame of data reports on an as needed basis. Once a data report is transmitted 205, the device waits for acknowledgement 210 from the transceiver 105. If no acknowledgement is received within a predetermined period, the device preferably resends the last report at least once. After a predetermined number of trials, the link is considered as non-functional, and recovery is attempted.

The timings between repetitions may be fixed differently for each device type. As represented in Table 1 of FIG. 2, an example illustrates at time t=0 that the device transmits a data report (upstream toggle=1) and the transceiver 105 has no payload to send to the device (downstream toggle=0). The report rate is one report every predefined period TS of 8 ms. Thus, there would be no less than 8 ms remaining until next frame.

However, consider in the example that the first report gets "jammed" (e.g., corrupted by a perturbating source) at the transceiver 105, which does not send acknowledge for the transmission. The device 110c now is in a wait state for this acknowledge, and thus repeats 2.5 the report using the same data toggle bits but a different time stamp (see Table 2). In this example, there was a 2.5 ms elapsed between the 1st and the $2^{nd}$ attempt, so the new time stamp will indicate 5.5 ms until next frame. The transceiver 105 will acknowledge 220 the second report (see Table 3), using the same upstream data toggle, same downstream data toggle bit ("no new downstream payload"), and using a special value for the timestamp (0xFF in the described example, meaning "ignore the timestamp"). Acknowledge is lost at the device level, and again the report needs to be retransmitted.

The device 110c has no knowledge of previous acknowledge from the transceiver, thus uses the old data toggle bits (see Table 4). The device 110c sends 225 out the 3rd report with a new timestamp (in the example 3.9 ms until next frame). The transceiver 105 acknowledges the report with the correct data toggle bits again (see Table 5), and the device 110c gets acknowledge 230 correctly. It will be appreciated that, the acknowledge packet can include a resynchronization request from the transceiver 105, that allows the device 110c to try sending next report at a time where other devices are not attempting to send using a downstream timestamp different than 0xFF. The acknowledge packet can also include a payload (such as commands to change the device's setup, or data to be displayed/handled by the device), which avoids extra traffic.

The notifications have to be acknowledged, however, by the device (packet with matching packet number). The transceiver 105 now has payload to send to the device 110c. The device 110c sends 235 out its next report on t=8 ms (see Table 6), with data toggle bits now set as upstream=0 downstream=0 with the appropriate timestamp (8 ms until next report). The transceiver 105 acknowledges 240 the upstream toggle=0, and change the downstream toggle to 1, because some payload is sent to the device (see Table 7). The above example assumes short reports from the device 110c to the transceiver 105 (upstream), and empty (no payload) reports from the transceiver 105 to the device 110c (downstream). Variable report length will be further described in more details later in this document in relation with smart pairing.

Figure 3:
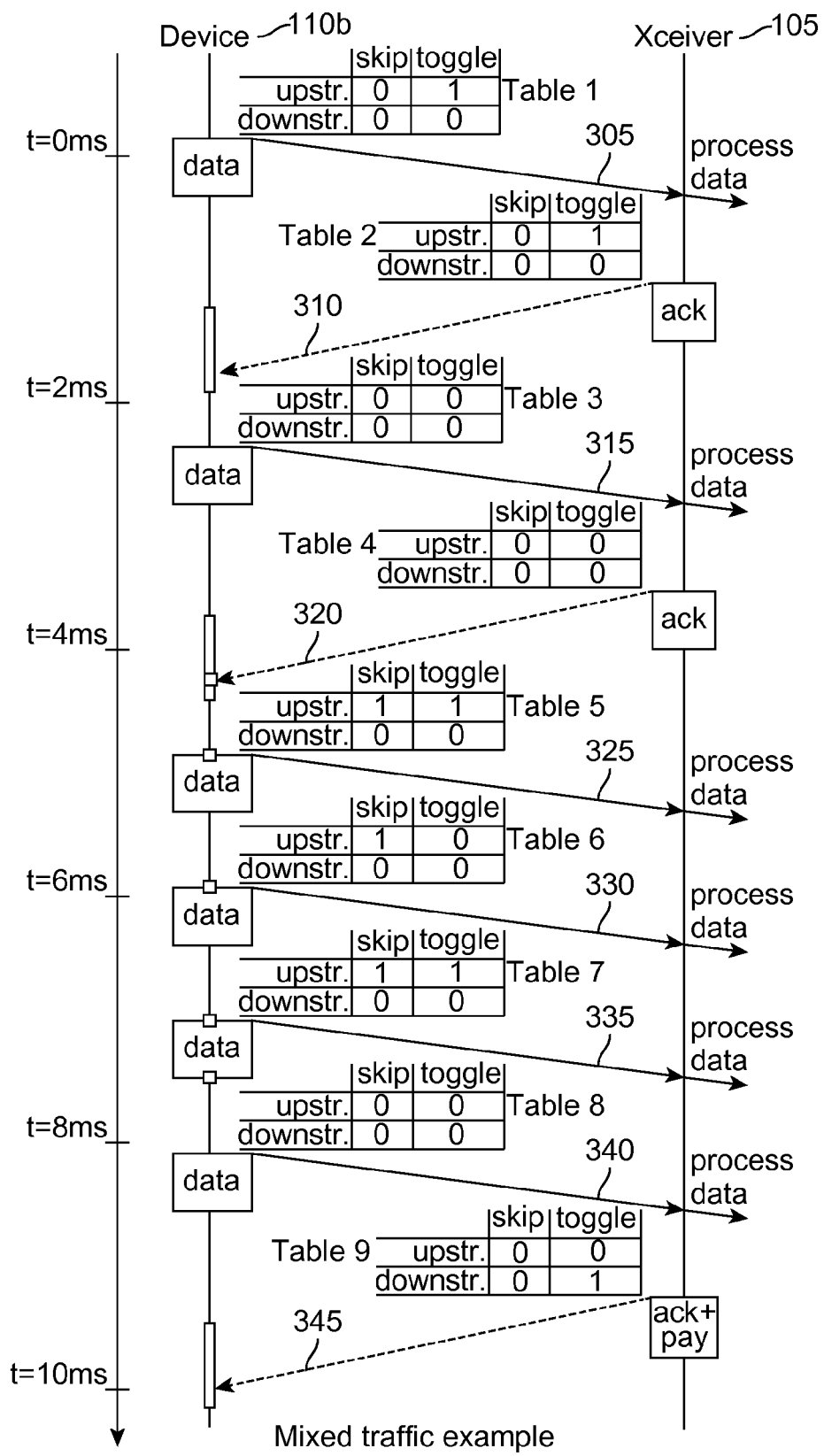
FIG. 3 shows an example of mixed traffic between one device and the transceiver.

FIG. 3 shows a mixed traffic example in which a device switches from bidirectional to unidirectional transmission mode in function of the kind of data to be transmitted. That is a device can switch between transmission modes, for example "on the fly" or real time. Advantageously bidirectional mode is used when data has to be acknowledged, for example, when a key is pressed (for example, on a keyboard 110c) or a button is clicked (for example on a mouse 110b or gaming device 110d) and unidirectional mode is used for data that might be lost once upon several transmissions, e.g., for motion reports. In the following example, the device considered may be a mouse, e.g., 110b. At time t=0, the device 110b is in reliable transmission mode (data+button report), and requests 305 its upstream reports to be acknowledged by the transceiver 105. The "skip ACK" bit, which tags each upstream report and indicates whether this report shall be acknowledged by the transceiver 105, is clear in the F field. The traffic 310, 315, 320 happens as usual in bidirectional traffic (see Table 1 to Table 4, which is sent and acknowledged). The device 110b then switches to non reliable transmission mode. The device 110b sends 325, 330, 335 upstream reports with the "skip ACK" bit set (see Table 5 to Table 7).

The transceiver 105 knows that it does not need to switch to transmission mode to acknowledge the report, thus stays in reception mode and is ready to receive a new upstream report immediately. This mode allows making report bursting at significantly higher report rate as in pure bidirectional mode. In the case of a mouse 100b, this non reliable transmission mode can be used whenever it is acceptable to loose one data report from time to time. For some type of information, such as mouse click, it is important that the information does not get lost, so the device may want to switch back to bidirectional mode when sending 340, 345 such data+button reports (see Tables 8 and 9). The transceiver 105 then is expected to acknowledge those reports, although the report rate may be limited.

It will be appreciated that many working models of network may be supported. It should be noted that bidirectional (⇔) devices (as compared with unidirectional devices ←) poll the host at a default rate. It is up to the receiver to change the polling rate depending on the usage model required. The table below gives an example of typical implementation, but other models can be considered as well.

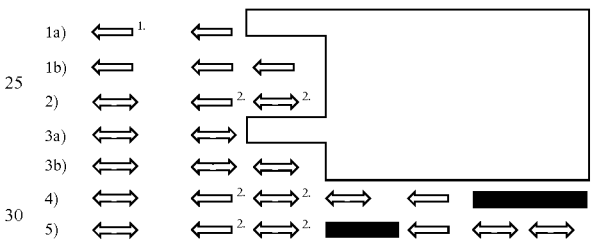

| Model | Transceiver | Mouse | Keyboard | Keyboard/Numpad | Remote control | Game device | Game device |
|---|---|---|---|---|---|---|---|
| 1a) | ⇐ 1. | ⇐ | | | | | |
| 1b) | ⇐ | ⇐ | ⇐ | | | | |
| 2) | ⇔ | ⇐ 2. | ⇔ 2. | | | | |
| 3a) | ⇔ | ⇔ | | | | | |
| 3b) | ⇔ | ⇔ | ⇔ | | | | |
| 4) | ⇔ | ⇐ 2. | ⇔ 2. | ⇔ | ⇐ | | |
| 5) | ⇔ | ⇐ 2. | ⇔ 2. | | ⇐ | ⇔ | ⇔ |

For model 1a), the transceiver 105 could implement no automatic ability to switch channels (requires user intervention), which could lead to a less expensive implementation that requires less processing power and/or slower hardware on the transceiver side. For models 2), 4) and 5), variations are possible: it would be possible to have, for instance, a bidirectional mouse and a unidirectional keyboard instead.

If one considers model 1a) with one single unidirectional device (e.g., 110a), the unidirectional device may feature a button (or any other mechanism) to allow the user to change channel manually if required, as the device will not change spontaneously. The device will not change channel spontaneously. The mouse transmits a report when it needs to. The report is sent three times, at the beginning of the frame, and at specific times within the frame. The second and third sending times have a random jitter.

Figure 6:
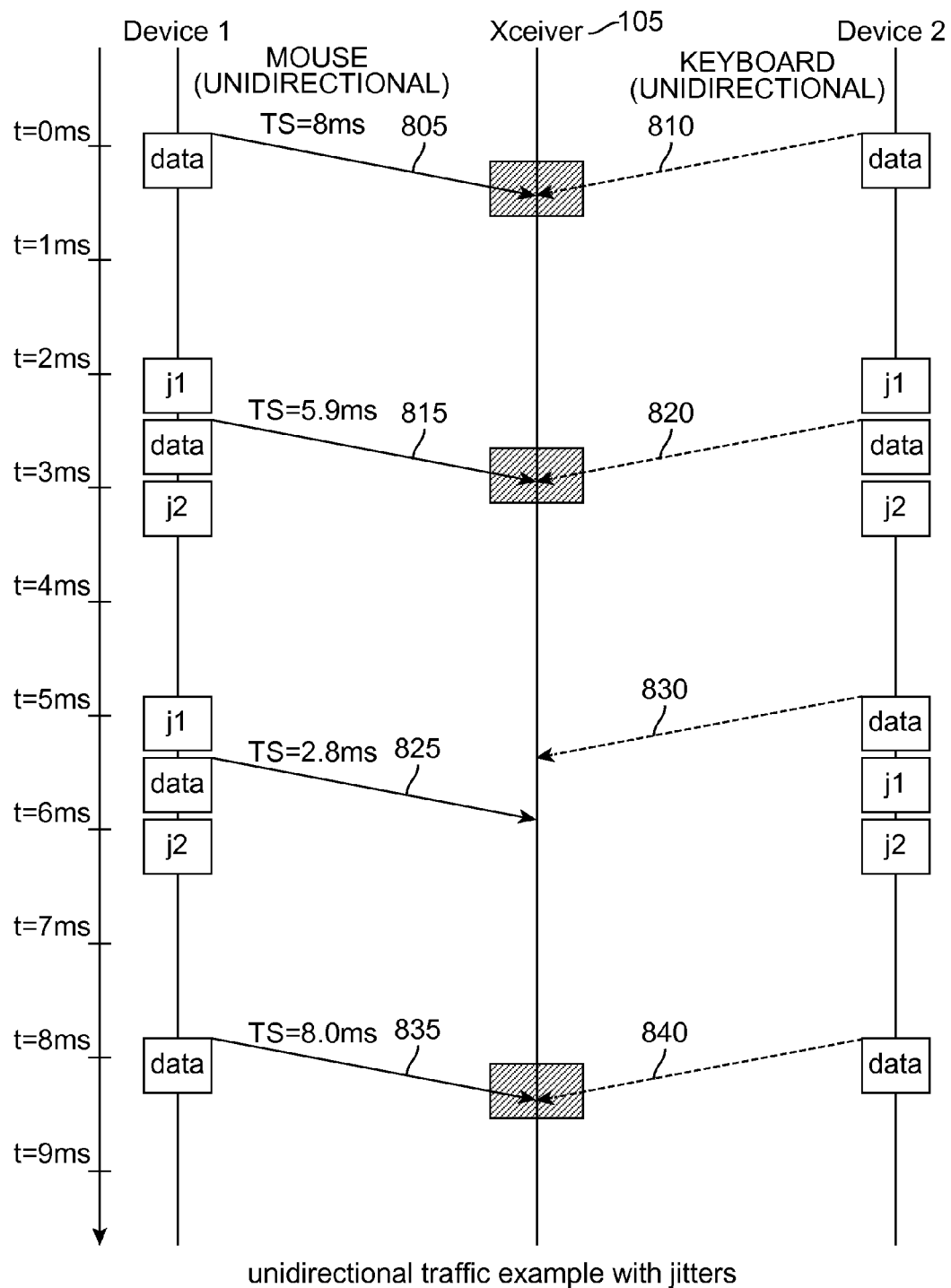
FIG. 6 show an example of two unidirectional devices talking to the same transceiver on the same channel.

If one considers model 1b) with two unidirectional devices, for instance a typical configuration for this model is one mouse (unidirectional) and one keyboard (unidirectional), the devices transmit a report whenever they need to, and repeat it a fixed number of times (total of three reports per frame). The two devices can be factory-programmed to the same address and channel. Both devices feature a way to change the channel (dedicated button or key combination). If the channels of the two devices differ, the transceiver 105 will use time-multiplexing to listen to both channels. The timings used by the devices are chosen so that no user action is lost in a clean RF environment (at least one repetition gets through to the transceiver). FIG. 6, further described below, shows an example of favorable timings.

If one considers model 2) with one unidirectional and one bidirectional device, for instance a typical configuration for this model is one mouse (e.g., 110b) and one keyboard (e.g., 110c), all devices share the same address, but the transceiver uses a different address to transmit, so that the bidirectional device does receive the traffic from the other device. The devices paired on the same transceiver share its base address, but have their own destination ID. Only the unidirectional device features a way to change the channel (dedicated button or key combination). If the channels of the unidirectional device change, the bidirectional device will be brought on the same channel. Until the devices are all on the same channel, the transceiver 105 may use time-multiplexing to listen to the two channels. The transceiver 105 has the possibility to resynchronize slightly the frame so that no jamming occurs between the two devices. In one embodiment, the unidirectional device can be configured to resend a fixed number of times a report. Similarly, in one embodiment, a bidirectional device can be configured to send retries as long the transceiver 105 has not acknowledged it.

If one considers model 3a) with one bidirectional device (e.g., 110*a*), for instance a typical configuration for this model is one mouse, when it needs to, the device transmits a report with its address, but the transceiver 105 uses a different address to transmit, so that the bidirectional device does receive the traffic from the other potential devices. The report is only repeated if no acknowledge is received from the transceiver. The channel will be changed automatically upon detection of poor radio link conditions. The device considers the link as bad for instance (but not limited to) if no acknowledge has been received after a given number of retries, or poor radio signal strength from the transceiver. The transceiver, which knows the device's report rate, considers the link as lost when, for instance (but not limited to) no report has been received from the device after enough time for the device to send a new report, including repetitions, or when the radio signal strength from the mouse is too low. The criteria for considering the link as bad obviously also applies to the other working models. This model accommodates reports rates higher than normal ones.

If ones considers model 3b) with two bidirectional devices (e.g., 110*c*, 110*d*), for instance a typical configuration for this model is one mouse (bidirectional) and one keyboard (bidirectional), all devices share the same base address, but the transceiver uses a different address suffix (destination ID) to transmit, unique to each device, so that the bidirectional device does receive the traffic from the other device. The devices share the same base address and channel. Each device transmits a report when it needs to. The report is only repeated if no acknowledge is received from the transceiver 105. The channel will be changed automatically (initiated by the transceiver 105 or any of the devices) in case of bad RF conditions (too many repetitions, lost reports, or low RF signal if RSSI is provided). All devices will always be brought to the same channel. Until the devices are all on the same channel, the transceiver 105 will use time-multiplexing to listen to the two channels. The transceiver has the possibility to resynchronize slightly the frame so that no jamming occurs between the two devices. This model accommodates reports rates higher than normal ones.

Model 4) comprises two unidirectional (e.g., 110*a*, 110*b*) and two bidirectional devices (e.g., 110*c*, 110*d*), a typical configuration of which is one mouse, two keyboards and a remote control. This model is the same as model 3*b*), the remote controller will broadcast on all possible channels, so that it does not matter on which channel the other devices are.

Model 5) comprises two unidirectional and three bidirectional devices, a typical configuration of which is one mouse, one keyboard, a remote control, and two gaming controllers. For example, unlike typical bidirectional input devices, gaming controllers provide a connect button that allows them to get their address from the transceiver 105. Gaming devices often are bidirectional, and can be configured to have priority over other bidirectional devices in terms of time synchronisation.

Optimized Transmission Link

According to another aspect of the present invention, several features may be implemented in order to avoid collisions when transmitting data. It will be appreciated that each feature participates to optimize transmissions between the transceiver and the device which needs to transmit data. It should be taken into account that many different types of collisions may occur in the high frequency ISM bands, for instance 2.4 GHz.

Figure 4A:
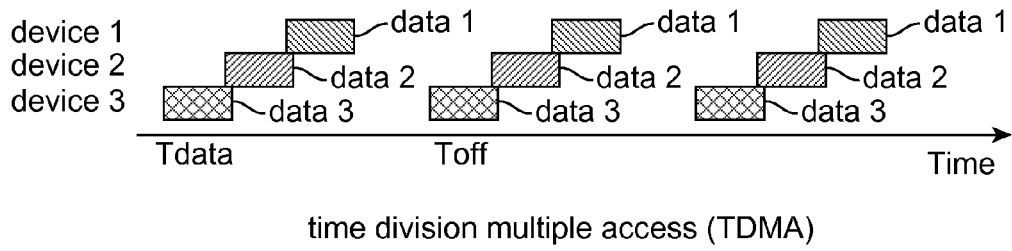
FIGS. 4a, 4b and 4c show features for avoiding collisions with other devices or applications according to the second embodiment of the invention.
Figure 4B:
Figure 4C:
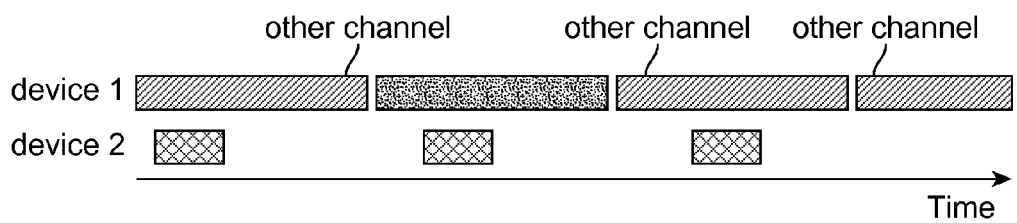

FIGS. 4*a*, 4*b* and 4*c* illustrate collision avoidance configurations for device, e.g., 110 communications with the transceiver 105 relative to other neighboring devices or applications. FIG. 4*a* shows a time division multiple access (TDMA) implementation for three devices (1, 2 and 3) transmitting data in the form of small bursts rather than continuous transmission. The time ratio between the time for transmitting a burst (Tdata) and the time between two consecutive bursts (Toff) is relatively small and maybe defined in function of the number of devices in the application. Thus, between transmissions of two bursts of one device, sufficient time is available for other devices to send data bursts and consequently collisions occurring between transmissions of devices of a same application are reduced.

FIG. 4*b* shows random added jitters on repetitions after a collision sequence has occurred between two devices 1 and 2. In the represented example, both first data bursts (data 1 and data 2) have been transmitted simultaneously to the transceiver 105 and a collision has occurred which means that none of the two data bursts have been correctly received by the transceiver 105. Each device adds a random timing in the form of jitters added before or after resending the last data report. The added jitters further reduce collision risks with devices of the application or of similar applications located around. It is to be noted that it is of every application's interest to minimize collisions, not only making the protocol more robust, but also making sure not to degrade other radio frequency link performance.

Referring briefly to FIG. 6, it illustrates a more detailed example of unidirectional traffic with added jitters. At time t=0, device 1 decides to transmit 605 a data report. In this example, its frame counter is a simple upstream counter, as the device is unidirectional, and the report rate is one report every 8 ms, which means that there would be no less than 8 ms remaining until next frame. However, the first report gets jammed at the transceiver by another device 2 sending 810 on the same channel (but using a different address), at the exact same time. Both devices 1 and 2 resend 815, 820 the report (with the same frame counter) after 2.1 ms. A random jitter (j1 and j2), for instance of −200 microseconds (us), 0 microsecond (us) or +200 us is added to this timing by each device and reported in the timestamp field. In this example, the jitter happens to be the same, thus the report is lost again. Both devices 1 and 2 send 825, 830 the report a third time (with the same frame counter), using again a random jitter (j1 and j2) of −200 us, 0 us or +200 us. This time, the jitter happens to be different, and the report gets through. Then the devices send 835, 840 its next report on t=8 ms, with a new upstream frame number. Because both devices 1 and 2 are synchronous, the first report may be lost once again, however the jitter mechanism allows the second or the third report to get through most of the time.

For data transmission, allowed radio space frequency channels are defined. In one embodiment, a channel could be 1 MHz wide. Further, by way of example, RF channel 0 could be centered on 2400 MHz, RF channel 1 around 2401 MHz, etc. A certain number of channels, for example, following a sub-set of channels that are known to be less prone to be occupied by other wireless devices operating on the same RF band may be used for transmission. These channels have been chosen because they are located outside (or close to the edge) of the lobes of 802.11b/g WLAN channels 1, 6 and 11 (and 14 for Japan). Thus, chances of collisions with WLAN transmission are reduced regardless of the channel being used. More generally, in one embodiment, channels for transmission are selected from channels outside of common applications.

Furthermore, the device will preferably ping (e.g., transmission attempt) several times, for example three times, on each channel for transmitting data to the transceiver. Turning back to FIG. 4c, it illustrates an implementation of a smart timing which allows escaping from applications based on frequency hopping transmission such as Bluetooth. As represented, frequency hopping involves that device 1 transmits data with a new channel each time. This allows use of a same channel several times, e.g., as device 2 allows, even in case of a collision during the first attempt having a free band for the next attempts. Thus, a protocol in accordance with the present invention promotes frequency agility rather than frequency hopping.

Each device monitors the amount of lost report (successful or unsuccessful retries). Typically, frequency agility is possible with bidirectional devices (e.g., 110c, 110d). The decision of entering a link recovery mode is taken individually, by host (connection lost with any device) and by the bidirectional device (connection lost with host). Unidirectional devices (e.g., 110a, 110b) require a user intervention to change the channel manually, by pressing a connect button, or by using an alternate channel changing mechanism.

Moreover, the protocol can be configured to include a recovery mode in case of link-loss or bad transmission detection. To recover the connection with the transceiver, the device pings the host (via the transceiver) a few times, and expects acknowledge. This means that the transceiver is active and listening on the same address and channel as the device, and is capable of handling the link. After a few trials, the device concludes that the link cannot be restored at this point, and enters a more aggressive link recovery mode (active recovery).

Upon entering a recovery mode state, all default values (passed during pairing and stored in non-volatile memory) are restored (report length, channel, poll timings, etc.). In this state, the device will attempt to send a series of ping reports on all possible channels, in a given sequence, until an acknowledge is received or a timeout imposes a go back to an idle state, in which the device waits for user activity. In this latter case, a "link lost" flag is raised. The device will then be in a power saving mode but will still attempt to ping the transceiver 105 regularly, and attempt again to actively recover the link upon user activity.

In order to recover connection between the device 110 and the transceiver 105, a cycling procedure through all channels is provided. Advantageously, the current channel is repeated for the first time. This allows the transceiver 105 to go to timeout and switch already to the next channel, which improves the link recovery time. For that purpose, the device will ping a maximum of three times on each channel. If no acknowledge is received after these pings, the channel will be changed; cycling through all channels. After cycling several times over all channels, a link loss condition is deduced. The device 110 enters low power mode, and will only attempt to recover the channel upon user activity.

Alternatively, according to another recovery scheme, the mouse device 110 (e.g., mouse) the host once on the last known working channel, and then twice on one of the other defined channels. If all pings fail, then the mouse attempts again a ping on the last known working channel, and then two pings on the next channel in the table. Then again one ping one the last good working channel, then two on the following channel in the table, etc. This ensures much lower recovery time in some usage cases, while not degrading the latency in the others.

Figure 5A:
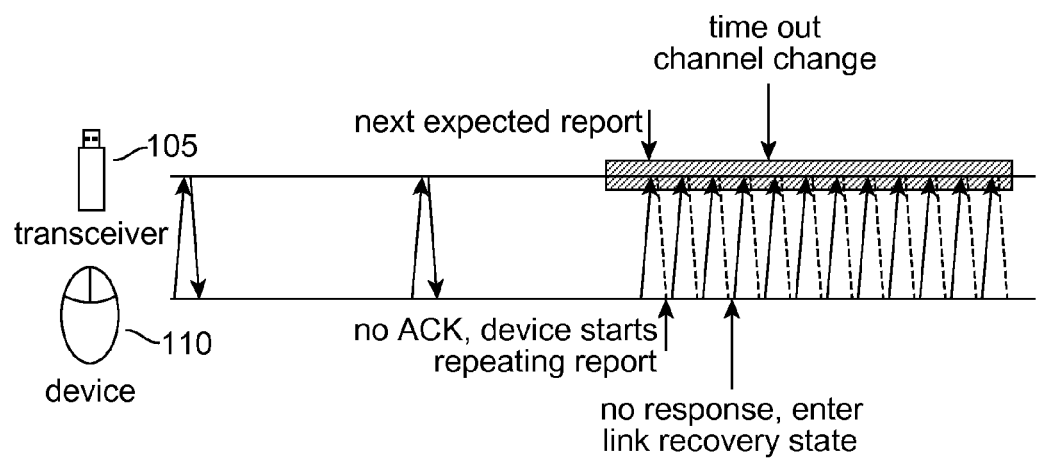
FIGS. 5a and 5b show unsuccessful and respectively successful channel change according to an embodiment of the invention.

Turning now to FIG. 5a, it depicts an unsuccessful channel change to re-establish the link with the transceiver 105. It shows a case where after several, for instance two, data reports having been successfully transmitted to the transceiver 105, the current channel becomes jammed, which means that the device 110 receives no acknowledgment of its report and starts repeating the last report. After several attempts with no response, the device 110 enters a link recovery state and after a timeout the channel is changed. However in the represented example of FIG. 5a, the next channel in the channel table is also jammed, i.e., no response being received by the device 110 from the transceiver 105. Therefore the procedure goes on and it may take time to find a free channel.

Figure 5B:
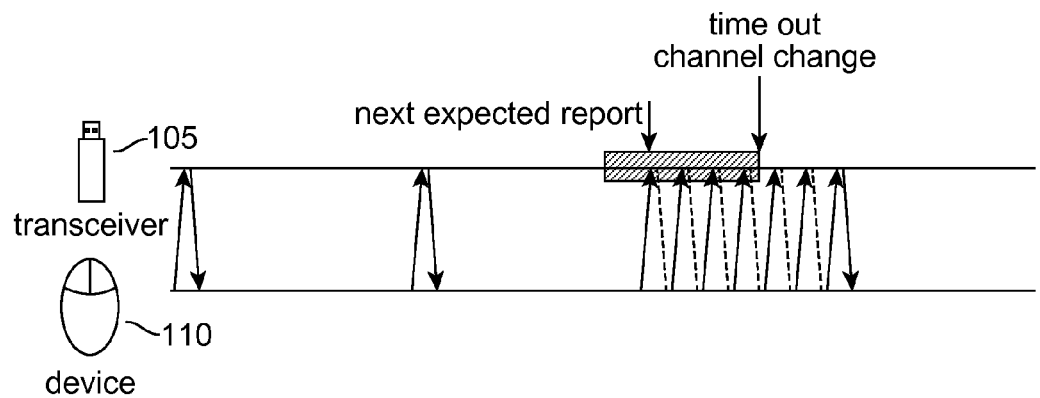

FIG. 5b depicts a successful channel change to re-establish the link between a device 110 and the transceiver 105. The Figure illustrates a scenario where after several data reports having been successfully transmitted to the transceiver 105, the current channel becomes jammed. After several attempts with no response, the device 110 enters a link recovery state. After a timeout the channel is changed. In this case, no acknowledgement has been received for the first two attempts to transmit reports with the new channel, however, acknowledge is received with the third attempt and thus the new channel is functional or free which is the usually expected case. Therefore, it takes significantly less time to recover the link. Preferably, in order to ensure that the new channel is indeed the correct one, the device attempts to ping the host a few more times. Upon acknowledge received successfully, the device writes the new channel into non-volatile memory.

Next, recovery mode on the transceiver side is now described. The transceiver 105 waits for RF packets on a given channel. If required, the transceiver's scheduler may decide to change the channel and/or the address to check other devices. Upon receiving an RF report, the transceiver 105 processes it and takes further actions accordingly. If no report is received for some time (actual timing is depending on the current power mode), the transceiver 105 enters link recovery mode by changing its reception mode channel periodically. If no report is received for some time (actual timing is depending on the current power mode), the transceiver 105 enters link recovery mode by changing its reception mode channel periodically. When several links are maintained by the transceiver 105, and only one of them is lost, then a channel change is negotiated with the device(s) with active link prior to changing to next channel. An additional requirement for negotiating a channel change with an active device may be that the poll timing is less than a given threshold.

Smart Pairing

A third aspect of the present invention provides smart pairing by which the transceiver 105 and each device 110 of the network 101 exchange information such as the minimum time between transmissions of two consecutive data packets. This pairing concerns data that are initially transmitted between the transceiver and each device in order to optimize future transmissions between them.

Upon pairing, a device 110 is made aware of the transceiver's address and default settings (report length, timings, etc.), and vice-versa. In particular, each peer (transceiver 105 or device 110) is aware of the time it takes to the other peer to process a packet and send acknowledge. Thus, during this "free time" (minimum time between two transmissions) the transceiver 105 may rest to save power or may open a negotiation procedure with any of the devices to adjust this period of time between two transmissions or open a new negotiation in order to free bandwidth for the transceiver 105. It also allows slowing down fast devices, in order to accommodate transceivers featuring slower hardware or having trade off on processing time dedicated to this particular device.

In order to reduce occupancy of on air-time as much as possible, it is desirable to make the RF reports as short as possible. Either the RF front end supports variable length reports, or it can only be configured for one fixed length report at a given time. In this case, depending on the needs, several report lengths may be defined (in the described example, there are three: "no-payload," "short" and "long"). The downstream and upstream reports can be any size and independent of the other.

The device 110 and the transceiver 105 default a report to a given length for each direction. The default report length information typically is contained in the pairing information, which depends on the application. The device 110 can be configured so that a most commonly used report length can be configured to be the default. Whenever needed, one of the peers (transceiver 105 or device 110) may request a report length change from the other peer, in order to momentarily transfer either bigger or smaller payloads. In some configurations, this may be done taking into consideration a cost of longer RF reports, longer on-air time and more energy spent, or conversely smaller payloads resulting then in less time and energy spent, but also less information passed.

In one embodiment, report length negotiation procedure takes place as follows. The device 110 and the transceiver 105 are in a given report length mode at any time. If reports longer than the current mode would be sent, a size negotiation has to take place between the two peers. If reports shorter than current mode would be sent, the peer can either pad the report or bring it to current length, or negotiate a shorter mode, whichever is more appropriate.

In one embodiment, one peer (initiator) sends a report with the required size set to the requested mode. If the change is accepted, the other peer (recipient) acknowledges in the current format (with or without payload, as required), but with the required size set to the requested mode. At this point, the initiator can start transmitting in the new mode. The recipient assumes that its response was received, and sets its receiver to the new length. Both peers (transceiver 105 and device 110) switch back to the default report mode in case no reports have been exchanged successfully for a given timeout. The actual timing depends on the negotiated polling rate, and is thus an amount of polls rather than a fixed timing. If some latency is expected, it is up to the peer to fill in the transfer with empty ("no payload") reports at a rate faster than the timeout, so that the peers do not enter active link recovery mode. The pairing information stored in each peer shall contain the default mode lengths of both transmitted and received reports. On power-on, or during active link recovery, those default modes can be selected.

Figure 7A:
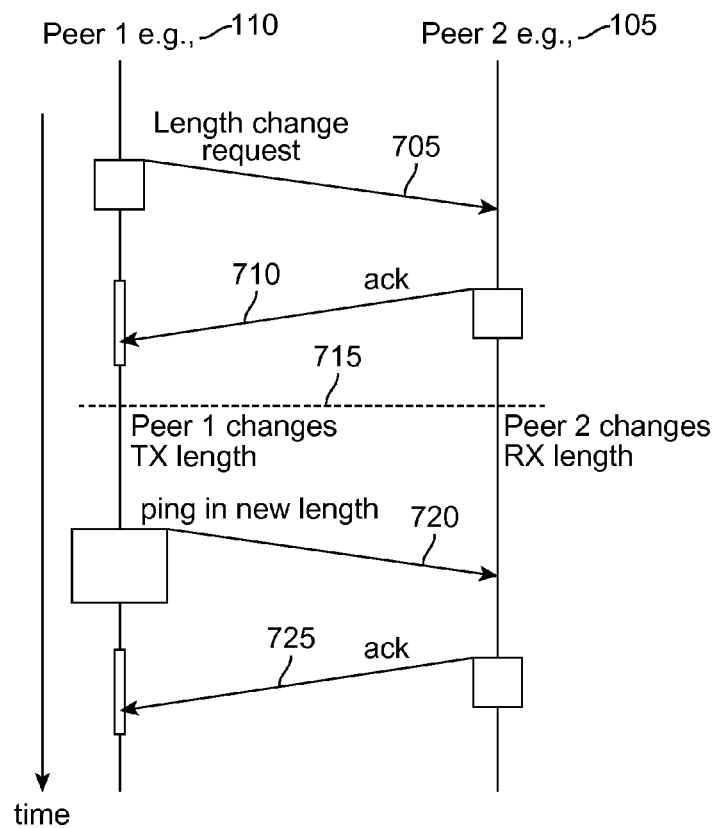
FIGS. 7a and 7b show successful, respectively unsuccessful transaction of a report length change according to the third embodiment of the invention.
Figure 7B:
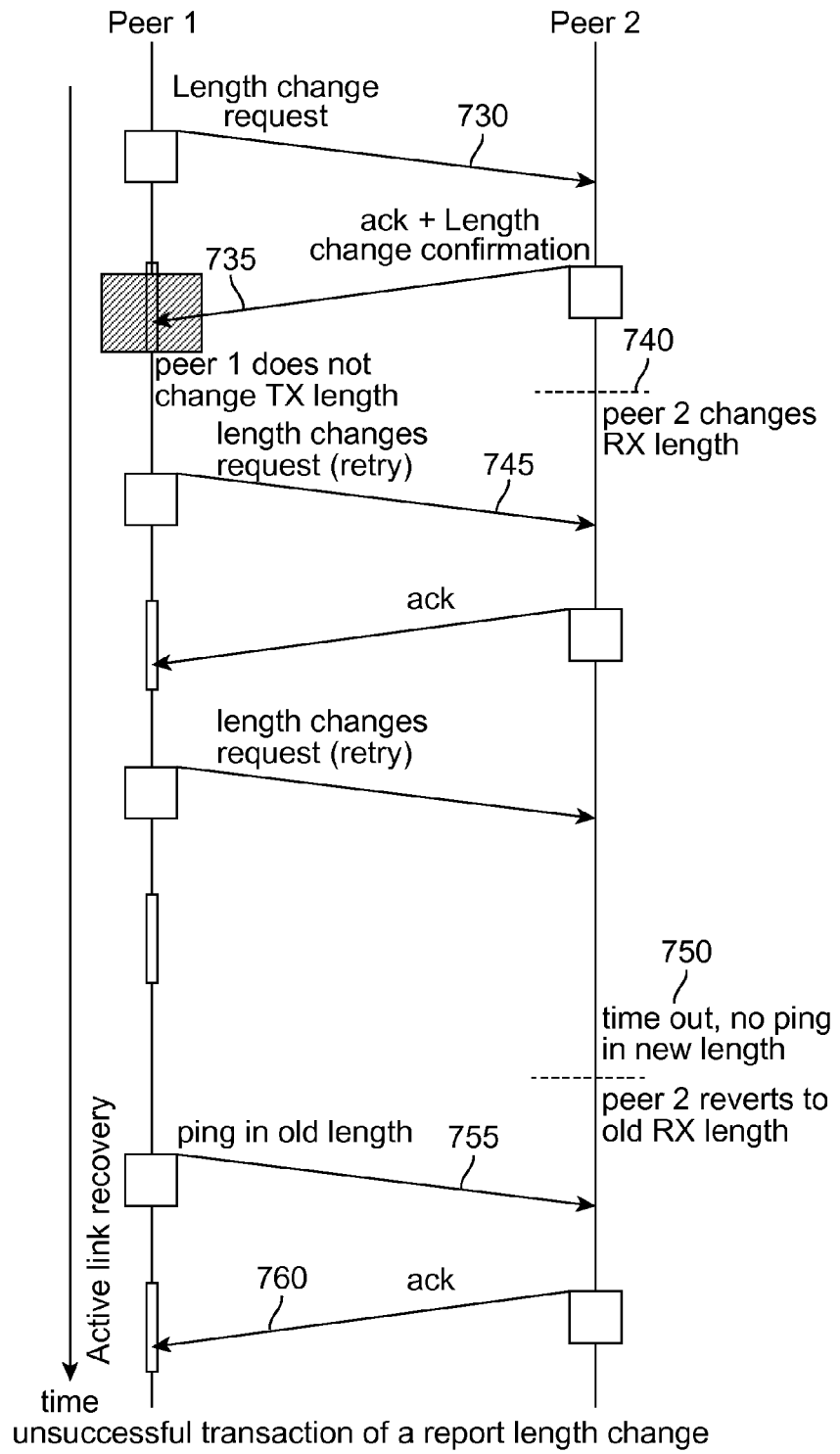

FIGS. 7a and 7b show a successful, respectively unsuccessful transaction of a report length change example. One peer requests a report length change (by setting the size accordingly), which means that it needs to change its transmission mode report length and requests the other peer to adapt its reception configuration accordingly.

On FIG. 7a, peer 1, for example, a device 110 changes the length for transmitting data reports (TX), and therefore, sends or transmits, 705 a length change request to peer 2, for example the transceiver 105. Peer 2 acknowledges 710 reception of the length change request which is received by peer 1. Then both peers 1 and 2 change 715 it transmission report length (TX), respectively it reception report length (RX). Therefore, the next report of peer 1 is transmitted (or sent) 720 with the new transmission length. Peer 2, which has changed accordingly its reception length, acknowledges 725 safe reception of the last report. Thereafter, peer 1 receives the acknowledgment.

In FIG. 7b, peer 1 also decides to change the length for transmitting data reports, and therefore, sends (or transmits) 730 a length change request to peer 2. Peer 2 acknowledges 735 safe receipt of the length change request, however for some reasons peer 1 does not receive the acknowledgment. Then, only peer 2 changes 740 its reception report length (RX) with peer 1 remaining with its former transmission report length (TX). Peer 1 resends 745 its length change request to peer 2, which does not receive it because of its new reception report length. After several unsuccessful retries, a timeout 750 occurs on peer 2 side which reverts to its former reception report length. In the meantime, peer 1 retries to send 755 a data report with its former transmission report length. This time, peer 2 receives it and sends (or transmits) 760 an acknowledgment to peer 1 which receives it (active recovery link).

Advantages of the present invention can be illustrated by example. For example, consider a configuration having two human interface devices 110, specifically a cordless mouse and a cordless multimedia keyboard, that are coupled with a personal computer. In this configuration, the purpose of the mouse typically is to send XY displacement and button click information (or data or reports) to the host PC. In this configuration, no information needs to be transported from the host to the mouse. Therefore, the mouse can be configured to have an active radio transmitter and an inactive, or removed, radio receiver.

Some devices such as keyboards, may be configured to be either unidirectional or bidirectional. For bidirectional configurations, a keyboard may feature a screen, e.g., a liquid crystal display screen, for displaying data received from a host device. The host device may be a computer communicatively coupled with the keyboard. The host may be configured to send data to the keyboard for display on the screen while a user continues typing on the keyboard. In some desktop embodiments, an overall desktop configuration may include a mouse with a unidirectional link coupling it with the host and the keyboard with the bidirectional link coupling it with the host. The complexity of a mouse design can be significantly reduced due to the unidirectional link. The bidirectional link of the keyboard allows for greater keyboard related functionality. Moreover, both devices can communicatively couple the host through the same interface. As configured in accordance with the principles disclosed herein, the overall configuration of both devices and the interface with the host requires a nominal amount of hardware and software resources compared with more complicated technologies (e.g., Bluetooth), and therefore, reduces overall complexity and costs.

Likewise, the system and process (and protocol) as structured in accordance with the principles herein allows for a bidirectional device to switch and transmit in unidirectional modes and thereafter switch back modes in real time (on the fly) based on communication bandwidth needs. For example, if the device is a bidirectional keyboard and a user typing on it is typing fast, this may demand greater transmission bandwidth to the host in order to prevent loss of data. In this example, the bidirectional keyboard may switch to a unidirectional mode and use the additional bandwidth for transmission to the host which previously was reserved for transmission from the host. In another example, a bidirectional pointing device (e.g., a mouse or trackball) may be tracking cursor displacement activity (e.g., clicks) and a rapid rate of such activity may cause report losses (e.g., lost data). In this example, the bidirectional pointing device also can switch to a unidirectional mode and use the bandwidth for transmission to the host which previously was reserved for transmission from the host.

Further, the transceiver 105 can be configured to know when to expect reports from a device 110 with which it is paired. In this configuration, the transceiver 105 is structured to determine when the next report would be available so that it may detect a link-loss condition in case no data is received. The transceiver 105 also can be configured to take actions to recover the link without the user noticing functional behavior. This configuration of smart pairing beneficially reduces power consumption because the transceiver 105 and device 110 are not unnecessary transmitting when they are not properly paired. Further, communications are optimized because defective links can be detected and repaired quickly.

It is noted that embodiments described may use the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a system and a process for a communication protocol and is application through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A communication protocol for use in a wireless network, the wireless network having a transceiver and a plurality of wireless input devices, at least one wireless input device configured as an unidirectional device and at least one other wireless input device configured as a bidirectional device, the communication protocol comprising:
   a unidirectional mode for communication from the unidirectional device to the transceiver; and
   a bidirectional mode for communication between the bidirectional device and the transceiver, the communication being either bidirectional or unidirectional,
   wherein a size of reports transmitted by a first wireless input device to the transceiver is negotiated between the first device and the transceiver, the negotiation comprising:
      transmitting, by the first device to the transceiver, a size adjustment request with a requested size, and
      responsive to the transceiver accepting the request, transmitting, by the transceiver to the first device, a response report at the requested size, and
   wherein responsive to a first report transmitted to the transceiver by the first device at the requested size colliding with a second report transmitted to the transceiver by a second wireless input device, the first device retransmitting the first report, the timing for initiating the retransmission being based on a type of the first device, each device type having a different timing for initiating retransmissions.

2. The communication protocol of claim 1, wherein the bidirectional device operates in a bidirectional transmission mode responsive to the bidirectional device transmitting a communication to the transceiver with an acknowledgment bit set to a first state and operates in unidirectional mode responsive to the bidirectional device transmitting a communication to the transceiver with the acknowledgment bit set to a second state.

3. The communication protocol of claim 1, wherein time division multiple access transmission is implemented between the network devices.

4. The communication protocol of claim 1, wherein a random jitter is added to the retransmission.

5. The communication protocol of claim 1, wherein at least one of the plurality of wireless devices uses frequency agility in data transmissions to the transceiver.

6. The communication protocol of claim 1, wherein a recovery mode is enabled by one of the plurality of wireless devices after detecting a link-loss or a bad transmission.

7. The communication protocol of claim 1, wherein responsive to one of the plurality of wireless devices detecting a link-loss or a bad transmission, the wireless device cycles through channels and on each channel attempts to communicate with the transceiver until a link is established.

8. The communication protocol of claim 1, wherein devices in the wireless network exchange information of a minimum time between two consecutive report transmissions.

9. The communication protocol of claim 8, wherein a negotiation between the devices that exchanged information adjusts the minimum time between two consecutive report transmissions.

10. The communication protocol of claim 1, wherein the unidirectional device is a wireless mouse.

11. The communication protocol of claim 1, wherein the bidirectional device is a wireless keyboard.

12. A transceiver for communicating with a plurality of wireless devices via a wireless network, at least one wireless device configured as an unidirectional device and at least one other wireless device configured as a bidirectional device, the transceiver comprising:
- a controller for communicating according to a communication protocol, the communication protocol comprising:
  - a unidirectional mode for communication from the unidirectional device to the transceiver; and
  - a bidirectional mode for communication between the bidirectional device and the transceiver, the communication being either bidirectional or unidirectional,
  - wherein a size of reports transmitted by a first wireless input device to the transceiver is negotiated between the first device and the transceiver, the negotiation comprising:
    - transmitting, by the first device to the transceiver, a size adjustment request with a requested size, and
    - responsive to the transceiver accepting the request, transmitting, by the transceiver to the first device, a response report at the requested size, and
  - wherein responsive to a first report transmitted to the transceiver by the first device at the requested size colliding with a second report transmitted to the transceiver by a second wireless input device, the first device retransmitting the first report, the timing for initiating the retransmission being based on a type of the device, each device type having a different timing for initiating retransmissions.

13. The transceiver of claim 12, wherein the unidirectional device is a wireless mouse.

14. The transceiver of claim 12, wherein the bidirectional device is a wireless keyboard.

15. A method for a first wireless input device to communicate with a transceiver, the transceiver and the first wireless input device part of a wireless network, the method comprising:
- negotiating with the transceiver a size of reports transmitted by the first wireless input device to the transceiver, wherein the negotiation comprises:
  - transmitting to the transceiver a size adjustment request with a requested size, and
  - responsive to the transceiver accepting the request, receiving from the transceiver a response report at the requested size;
- initiating transmission of a first report to the transceiver at the requested size;
- detecting a collision caused by the first report with a second wireless input device of the wireless network;
- determining, based on a device type of the first wireless input device, a timing for initiating retransmission of the first report, each device type having a different timing for initiating retransmissions; and
- retransmitting the first report according to the determined timing,
- wherein the wireless network has a plurality of wireless devices, at least one of the plurality of wireless devices is configured as an unidirectional device and at least one other of the plurality of wireless devices configured as a bidirectional device.

16. The method of claim 15, wherein the first wireless device is a wireless mouse.

17. The transceiver of claim 15, wherein the first wireless device is a wireless keyboard.

18. A communication protocol for use in a wireless network, the wireless network having a transceiver and a plurality of wireless input devices, at least one wireless input device configured as an unidirectional device and at least one other wireless input device configured as a bidirectional device, the communication protocol comprising:
- a unidirectional mode for communication from the unidirectional device to the transceiver; and
- a bidirectional mode for communication between the bidirectional device and the transceiver, the communication being either bidirectional or unidirectional,
- wherein a size of reports transmitted between the transceiver and a first wireless input device is negotiated, the negotiation comprising:
  - transmitting, by the transceiver to the first device, a size adjustment request with a requested size, and
  - responsive to the first device accepting the request, transmitting, between the first device and the transceiver, a response report at the requested size, and
- wherein responsive to a first report transmitted between the transceiver and the first device colliding with a second report transmitted between the transceiver and a second wireless input device, the first device retransmitting the first report, the timing for initiating the retransmission being based on a type of the first device, each device type having a different timing for initiating retransmissions.

* * * * *